United States Patent [19]

Beers et al.

[11] 3,960,802

[45] June 1, 1976

[54] PROCESS FOR THE MANUFACTURE OF A ONE-COMPONENT ROOM-TEMPERATURE VULCANIZABLE SILICONE COMPOSITION

[75] Inventors: Melvin Dale Beers, Elnora; Harold Chura, Waterford; Robert Joseph Robillard, Troy, all of N.Y.

[73] Assignee: General Electric Company, Waterford, N.Y.

[22] Filed: Nov. 27, 1974

[21] Appl. No.: 527,689

[52] U.S. Cl. .......................... 260/37 SB; 259/191; 259/192; 260/18 S; 260/46.5 G; 264/102; 264/349
[51] Int. Cl.² ......................................... C08L 83/04
[58] Field of Search ............ 259/191, 192; 264/349, 264/102; 260/46.5 G, 37 SB, 18 S

[56] References Cited
UNITED STATES PATENTS

| | | | |
|---|---|---|---|
| 3,267,075 | 8/1966 | Schnell et al. ...................... | 264/102 |
| 3,689,454 | 9/1972 | Smith et al. ...................... | 260/46.5 G |
| 3,719,632 | 3/1973 | Lengnick ...................... | 260/46.5 G |
| 3,803,084 | 4/1974 | Schnurrbusch et al. ........ | 260/46.5 G |
| 3,824,208 | 7/1974 | Link et al. ...................... | 260/37 SB |
| 3,849,462 | 11/1974 | Lengnick et al. ............... | 260/46.5 G |

*Primary Examiner*—Melvyn I. Marquis
*Attorney, Agent, or Firm*—John L. Young; E. Philip Koltos; Edward A. Hedman

[57] ABSTRACT

A novel process is disclosed for the manufacture of a one-component, room-temperature vulcanizable silicone composition which comprises passing a silanol chain stopped polydiorganosiloxane, a cross-linking silane and a silanol reactive organometallic ester compound of a metal through a devolatilizing extruder to form a one-component, room-temperature vulcanizable silicone composition.

28 Claims, No Drawings

PROCESS FOR THE MANUFACTURE OF A ONE-COMPONENT ROOM-TEMPERATURE VULCANIZABLE SILICONE COMPOSITION

This invention provides a novel process for manufacturing a one-component, room-temperature vulcanizable silicone composition which comprises passing a silanol chain stopped polydiorganosiloxane, a cross-linking silane and a silanol reactive organometallic ester compound of a metal through a devolatilizing extruder to form a one-component, room-temperature vulcanizable silicone composition.

BACKGROUND OF THE INVENTION

Single-component, room-temperature vulcanizable compositions are known in the prior art which vulcanize or cure to rubbery solids at room temperature. Examples of these compositions are found in U.S. Pat. No. 3,689,454; 3,619,255; 3,647,725; 3,705,120; and copending Ser. No. 417,787, filed Nov. 21, 1973 all of which are hereby incorporated by reference.

The prior art method of preparing room temperature vulcanizable compositions (RTV) has been by using a two-part procedure of producing a base compound of diorganopolysiloxane and a cross-linking agent. Thereafter, a separate catalyzation step is carried out in another piece of equipment. In particular, low modulus, one-package, room-temperature vulcanizable elastomers have been prepared in this manner and difficulty has been encountered in the production of these compositions. The abbreviation of RTV as used herein means a room-temperature vulcanizable material.

The chemical reactions, which form the curable low-modulus RTV, result in the elaboration of substantial amounts of heat which can result in a bubbled product due to the vaporization of the byproduct methanol (b.p. = 64.7°C). Also high shear mixing is required during a high viscosity rise which occurs during the preparation of the curable product. These factors have resulted in a batch type manufacturing process using different apparatus for different processing steps.

It has now been found that a low modulus curable RTV composition may be prepared by passing the organodipolysiloxane, the cross-linking agent and the catalyst through a devolatilizing extruder. This process allows for continuous production and facilitates the incorporation of compounding ingredients at precise points in the production stream so as to obtain the desired degree of dispersion and chemical reaction. Surprisingly, it has been found that the use of viscosity minimizing agents is substantially reduced or eliminated in this process and, therefore, the product has an extended shelf life of 18 months as compared to the product of the prior art process which has a shelf life of about 8 months. Accordingly, it is a primary object of this invention to provide an improved process for preparing a curable low modulus RTV composition.

It is also an object of this invention to provide a continuous process for the production of a curable catalyzed RTV composition.

It is also an object of this invention to provide a process for the production of a curable, catalyzed RTV composition which may be carried out without a viscosity minimizing agent.

It is also an object of this invention to provide an improved process for the production of a curable, catalyzed RTV composition which rapidly deaerate and devolatilizes the composition as it is being blended.

DETAILED DESCRIPTION OF THE INVENTION

The invention provides a process for the preparation of a fluid composition that is stable under substantially anhydrous conditions and is curable to a self-bonding elastic solid in the presence of moisture. The process comprises passing 100 parts by weight of a silanol chain stopped polydiorganosiloxane of the formula:

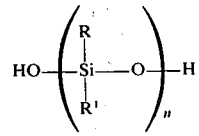

wherein R and $R^1$ are each, independently, organic radicals of up to 8 carbon atoms selected from hydrocarbyl, halohydrocarbyl and cyano lower alkyl and $n$ is an average number of from about 10 to 15,000, from 0.01 to 5.0 parts by weight of a crosslinking silane of the formula:

$$R^2{}_m Si (OR^3)_{4-m}$$

wherein $R^2$ and $R^3$ have the values defined for R and $R^1$ hereinabove and $m$ has a value of 0 to 3 and an average value based on the total amount of silane in the composition of 0 to 1.99; and a silanol reactive organometallic ester compound of a metal, said compound having radicals attached to the metal atom, at least one of said radicals being a hydrocarbonoxy radical or a substituted hydrocarbonoxy radical, said radicals being attached to the metal atoms through M—O—C linkages wherein M is the metal and any remaining valences of the metal are satisfied by substituents selected from organic radicals which are attached to the metal atoms through M—O—C linkages, —OH and —O— of a M—O—M linkage, the weight ratio of the silanol reactive organometallic ester compound to the cross-linking silane always being at least unity; and through a devolatilizing extruder to form a fluid composition that is curable to a self-bonding elastic solid in the presence of moisture.

Also, if desired, an extending and/or reinforcing filler may also be passed to the devolatilizing extruder. Generally, it may be preferred to feed separate streams of the compositions to the devolatilizing extruder, but if desired one or more preblends of the components may be prepared and these preblends may constitute a separate stream.

Generally, one or more silanol chain stopped polyorganosiloxanes of the above formula, having an average of at least about 2.01 silicon-bonded alkoxy radicals per silicon atom and the cross-linking silane compound and the silanol reactive organometallic ester.

The components are preferably at room temperature during mixing. Since the silanes tend to hydrolyze upon contact with moisture, care should be exercised to exclude moisture when the silane is fed to the devolatilizing extruder. Likewise, care should be taken that the mixture of the silane, the silanol reactive organometallic ester and the silanol chain stopped polydiorganosiloxane is maintained under substantially anhydrous conditions if it is desired to store the admixture for an extended period of time prior to conversion of the composition to the cured, solid, elastic silicone rubber state. On the other hand, if it is desired to permit the mixture to cure immediately, then no special precautions are necessary and the three components can be extruded and placed in the form or shape in which it is desired for the composition to be cured.

The amount of the silane cross-linker component to be preblended with the silanol chain stopped polydiorganosiloxane can vary within wide limits. However, for best results, it is preferred to employ less than one mole of the silane per mole of silanol groups in the silanol chain stopped polydiorganosiloxane component.

Moreover, it is preferred to employ an amount of organometallic ester which provides a total number of moles of silanol reactive ester linkages which is equal to or greater than the total number of moles of terminal silanol groups in the polydiorganosiloxane component.

Within the above framework, in the most preferred compositions to be prepared by the process of this invention, the weight ratio of silanol reactive to silane will be from 1 to 50, and especially preferably, from 1 to 10. Special mention is made of weight ratios of from 1 to 5.

So long as the specified ratios of ingredients are employed, a wide choice of components is available from which to prepare the compositions of this invention. These are described in many places, such as Smith and Hamilton, Ser. No. 282,337, filed Aug. 21, 1972, now allowed; U.S. Pat. Nos. 3,065,194; 3,294,739; 3,334,067 and 3,708,467, the disclosures of which are incorporated herein by reference.

With respect to the silanol chain stopped polyorganosiloxane component (a), these can be selected from those represented by the formula:

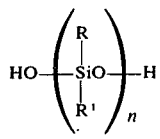

wherein R and $R^1$ are each organic radicals of up to 20, and preferably, up to 8, carbon atoms selected from hydrocarbyl, halohydrocarbyl and cyano lower alkyl, and $n$ is a number that varies generally from about 10 to 15,000, preferably from 300 to about 5,200, and more preferably, from 370 to 1,350.

The silanol chain-stopped polydiorganosiloxanes are well known in the art and include compositions containing different R and $R^1$ groups. For example, the R groups can be methyl, while the $R^1$ groups can be phenyl and/or beta-cyanoethyl. Furthermore, within the scope of the definition of polydiorganosiloxanes useful in this invention are copolymers of various types of diorganosiloxane units, such as silanol chain-stopped copolymers of dimethylsiloxane units, diphenylsiloxane units and methylphenylsiloxane units, or for example, copolymers of dimethylsiloxane units, methylphenylsiloxane units and methylvinylsiloxane units. Preferably, at least 50% of the R and $R^1$ groups of the silanol chain-stopped polydiorganosiloxanes are alkyl, e.g., methyl groups.

In the above formula, R and $R^1$ can be, for example, mononuclear aryl, such as phenyl, benzyl, tolyl, xylyl and ethylphenyl; halogen-substituted mononuclear aryl, such as 2,6-dichlorophenyl, 4-bromophenyl, 2,5-difluorophenyl, 2,4,6-trichlorophenyl and 2,5-dibromophenyl; alkyl such as methyl, ethyl, n-propyl, isopropyl, n-butyl, sec-butyl, isobutyl, tertbutyl, amyl, hexyl, heptyl, octyl; alkenyl such as vinyl, allyl, n-butenyl-1, n-butenyl-2, n-pentenyl-2, n-hexenyl-2, 2,3-dimethylbutenyl-2, n-heptenyl; alkynyl such as propargyl, 2-butynyl; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3-dibromopentyl, chlorohexyl, bromohexyl, 1,4-dichlorohexyl, 3,3-dibromohexyl, bromooctyl; haloalkenyl such as chlorovinyl, bromovinyl, chloroallyl, bromoallyl, 3-chloro-n-butenyl-1, 3-chloro-n-penetenyl-1, 3-fluoro-n-heptenyl-1, 1,3,3-trichloro-n-heptenyl-5, 1,3,5-tri-chloro-n-octenyl-6, 2,3,3-trichloromethylpentenyl-4; haloalkynyl such as chloropropargyl, bromopropargyl; cycloalkyl, cycloalkenyl, and alkyl and halogen substituted cycloalkyl and cycloalkenyl such as cyclopentyl, cyclohexyl, cycloheptyl, cyclooctyl, 6-methylcyclohexyl, 3,4-dichlorocyclohexyl, 2,6-dibromocycloheptyl, 1-cyclopentenyl, 3-methyl-1-cyclopentenyl, 3,4-dimethyl-1-cyclopentenyl, 5-methyl-5-cyclopentenyl, 3,4-dichloro-5-cyclopentenyl, 5-(tert-butyl)1-cyclopentenyl, 1-cyclohexenyl, 3-methyl-1-cyclohexenyl, 3,4-dimethyl-1-cyclohexenyl; and cyano lower alkyl such as cyanomethyl, beta-cyanoethyl, gama-cyanopropyl, delta-cyanobutyl, and gamma-cyanoisobutyl.

A mixture of various silanol chain-stopped polydiorganosiloxanes also may be employed. The silanol chain-stopped materials useful in the RTV compositions of this invention have been described as polydiorganosiloxanes but such materials can also contain minor amounts, e.g., up to about 20% of monoorganosiloxane units such a monoalkylsiloxane units, e.g., monomethylsiloxane units and monophenylsiloxane units. See, for example, Beers, U.S. Pat. Nos. 3,382,205 and 3,438,930 which are incorporated herein by reference.

The silanol chain-stopped polydiorganosiloxanes employed in the practice of the present invention may vary from low viscosity thin fluids to viscous gums, depending upon the value of $n$ and the nature of the particular organic groups represented R and $R^1$.

The viscosity of the polydiorganosiloxane component can vary broadly, e.g., in the range of 30 to 10,000,000 cps. at 25°C. Preferably, it will be in the range of 2,000 to 1,000,000 and most preferably, from about 20,000 to 200,000 cps. at 25°C.

The silane cross-linking agent of the formula:

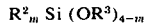

is one which has values for $R^2$ and $R^3$ which are the same as those defined for R and $R^1$ above.

Illustrative of such silanes useful in the RTV compositions of this invention are the following:

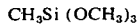

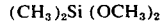

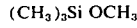

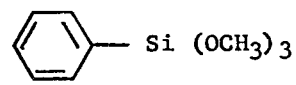

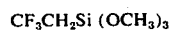

The silanes are well known in the art and are disclosed, for example, in Berridge, U.S. Pat. No. 2,843,555.

When the silane is employed as a cross-linking agent, $m$ has a value of 1 and the preferred silane is $CH_3Si(OCH_3)_3$. When it is desired to have a chain extending agent employed in combination with the cross-linking agent, $m$ has a value of 2 resulting in the silane being difunctional. The preferred difunctional silane is $(CH_3)_2Si(OCH_3)_2$. The presence of a chain extending agent results in a final cured product having a higher degree of elasticity. The same result would be obtained if a higher molecular weight silanol-stopped fluid were used. Then, however, the curable composition also has a higher viscosity and is very difficult to handle.

The modulus of elasticity can be improved still more by using a silane of the above formula wherein m has a value of 3. The preferred silane for this purpose is $(CH_3)_3SiOCH_3$. The use of such monofunctional silane chain terminating unit in combination with the cross-linking and optional chain extending silanes discussed above, not only results in a higher modulus of elasticity but in many instances also provides a further improvement in adhesion of the cured compositions to a substrate.

The preferred silanes of the above formula will contain on the average of from 1.05 to 3 silicon-bonded alkoxy groups per silane when a fluid containing two silanol-containing terminal groups is employed. If the number of alkoxy groups are only two this merely results in a build-up of chain length. Average in this situation means the total number of siliconbonded alkoxy groups divided by the total number of silane molecules used in the RTV composition.

With respect to silanol reactive organometallic ester component, in general the types of metals can vary broadly, so long as silicon is not included — because of the need to provide a selectively hydrolyzable Si-O-M bond. Preferably, the metal will be selected from lead, tin, zirconium, antimony, iron, cadmium, barium, calcium, titanium, bismuth, manganese, zinc, chromium, cobalt, nickel, aluminum, gallium or germanium. Most preferably, the metal is titanium. The organometallic compound is preferably an orthoester of a lower aliphatic alcohol, a partially chelated ester of a lower aliphatic alcohol with a β-dicarbonyl compound or a partial hydrolyzate of such compounds which retain at least one hydrocarbonoxy radical or substituted hydrocarbonoxy radical attached to the metal atom through M—O—C linkages.

Especially important are partially chelated organometallic esters and particularly titanium compounds of the formula:

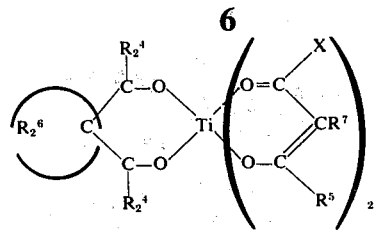

or

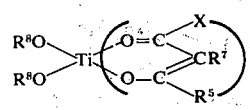

wherein $R^4$ is hydrogen, or an organic radical of up to 8 carbon atoms selected from hydrocarbyl, halohydrocarbyl, or carboxyalkyl; $R^5$ is a radical of up to 8 carbon atoms selected from hydrocarbyl, halohydrocarbyl and cyano-lower alkyl; $R^6$ is selected from the same group as $R^4$ and in addition from halo, cyano, nitro, carboxy ester, or acyl and hydrocarbyl substituted by halo, cyano, nitro, carboxy ester and acyl the total number of carbon atoms in the $R^4$ and in the $R^6$ substituted alkanedioxy radical being not more than about 18; $R^7$ is selected from hydrogen or an organic radical of up to 8 carbon atoms selected from hydrocarbyl, halohydrocarbyl, or acyl and, when taken together with $R^5$ forms together with the carbon atoms to which they are attached a cyclic hydrocarbon substituent of up to about 12 carbon atoms or such a substituent substituted with one or more of a chloro, nitro, acyl, cyano or carboxy ester substituents; X is a radical of up to 20 carbon atoms selected from hydrocarbyl, halohydrocarbyl, cyanoalkyl, alkoxy, haloalkoxy, cyanoalkoxy, amino or ether and polyether groups of the formula $—(C_qH_{2q}O)_vR$ where $q$ is from 2 to 4, $v$ is from 1 to 20 and R is as defined above, $a$ is 0 or an integer of up to 8 and, when $a$ is 0, the $>C—R_2^4$ groups are bonded to each other in a cyclic fashion, and $R^8$ is a radical of up to 8 carbon atoms selected from hydrocarbyl, halohydrocarbyl or cyano-lower alkyl.

These are made by reacting a beta-dicarbonyl compound with a titanium compound, to form a dialkoxy titanium chelate. The dialkoxy titanium chelate can then be reacted with a corresponding alkanediol to produce a wholly cyclic-substituted chelated titanium compound. The preparation of such compounds is described in the above-mentioned Application Ser. No. 282,337, filed Aug. 21, 1972, and in U.S. Pat. Nos. 3,334,067 and 3,708,467.

Illustrative of such compounds are:

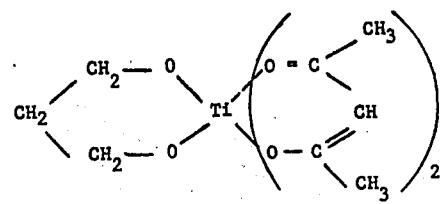

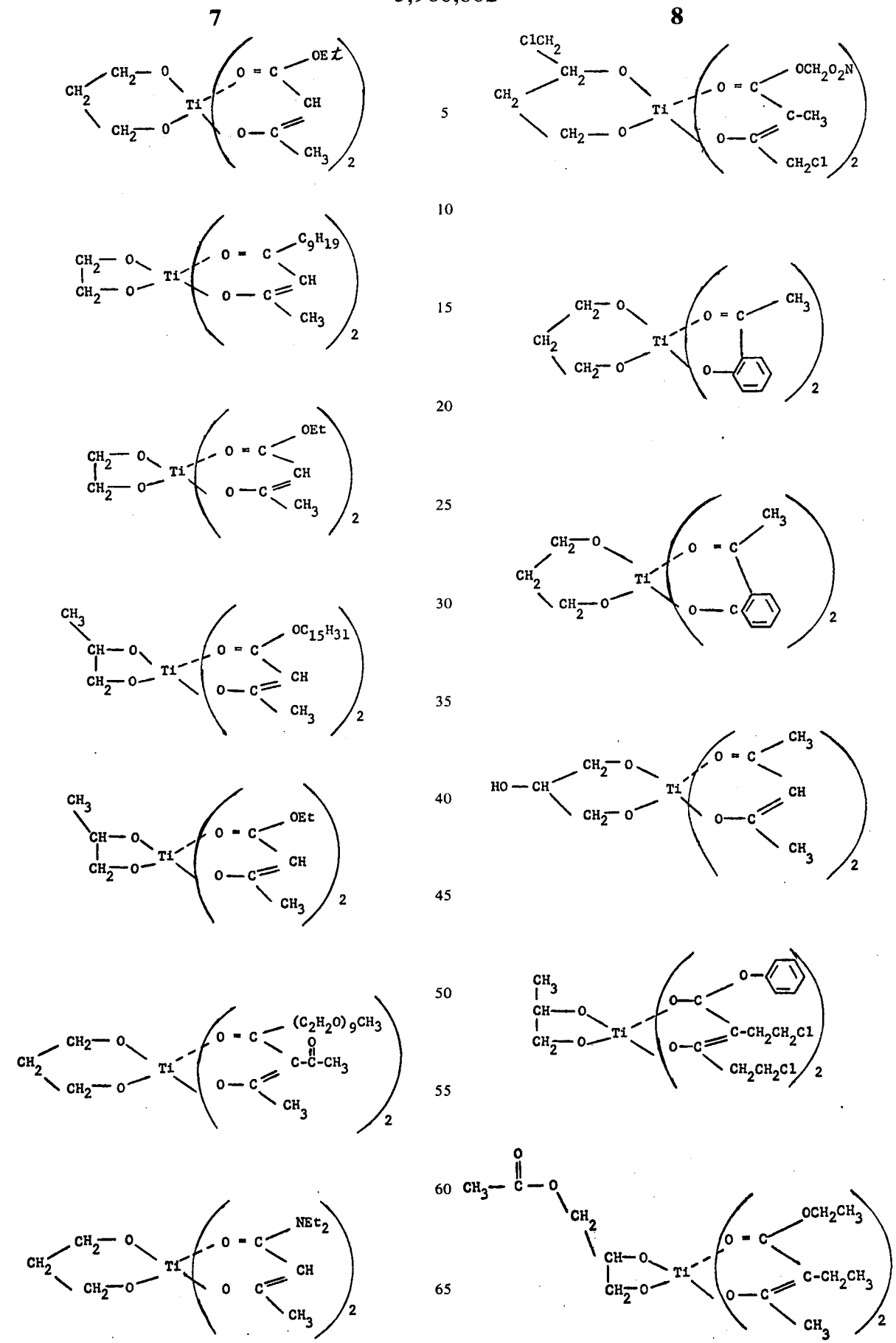

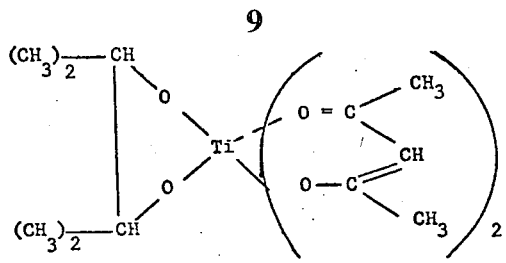

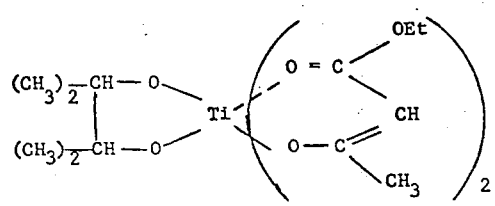

Other examples will be readily apparent from the description of substituents which may be present on the titanium. Most preferably, component (c) will have the formula:

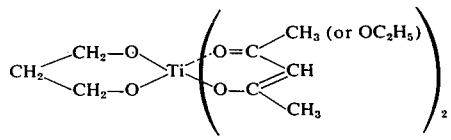

The RTV compositions of the present invention can also be modified by the incorporation of various extenders or fillers. Illustrative of the many fillers which can be employed with the compositions of the present invention are titanium dioxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. Among the most useful fillers are calcium carbonate alone, or mixed with fumed silica. Organosilicone- or silazane-treated silica fillers, such as those described in Lucas, U.S. Pat. No. 2,938,009; Lichtenwalner, U.S. Pat. No. 3,004,859; and Smith, U.S. Pat. No. 3,635,743, are also particularly suitable for use in the RTV compositions of the present invention. The fillers are generally employed in amounts from about 5 to about 200 parts, and preferably, from 10 to about 100 parts by weight per 100 parts of silanol chain-stopped polydiorganosiloxane component.

In addition to fillers, the present compositions can also optionally include an adhesion promoter, e.g., from 0.2 to 2 parts of such promoter per 100 parts of component. These will generally be nitrogen-containing compounds, e.g., acetonitrile. A preferred class of promoters is those of the formula:

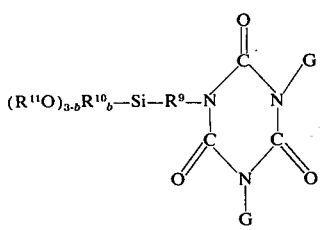

wherein G is the same as $R^{10}$, hereinafter defined, a $(R^{11}O)_{3-b}$—$R_b^{10}$ Si $R^9$ radical, styryl, vinyl, allyl, chloroallyl or cyclohexenyl; $R^9$ is a divalent radical selected from alkylenearylene, alkylene, cycloxylene and halo-substituted such divalent radicals; $R^{10}$ is a radical of up to 8 carbon atoms selected from hydrocarbyl or halohydrocarbyl and $R^{11}$ is a radical of the type defined for $R^{10}$ and also cyano lower alkyl; and $b$ is 0 to 3.

Such adhesion promoters are disclosed in the copending application of Berger, Ser. No. 301,637, filed Oct. 27, 1972, which is incorporated herein by reference. The most preferred such promoters are 1,3,5-tris-trimethoxysilylpropylisocyanate and bis-1,3-trimethoxysilylpropylisocyanurate.

The preferred method of carrying out the process of the invention is to feed separate streams of silanol chain stopped polysiloxane, crosslinking silane, organometallic ester and filler to a twin-screw ddevolatilizing extruder. Optionally, if more than one filler is employed these may be fed in separate streams to the extruder or they may be preblended and fed as a separate stream. Pigments and other adjuvants may also be added by the above-described procedure.

The preferred type of devolatilizing extruder is a twin-screw Werner-Pfleiderer extruder mixer, Model Z SK.

DESCRIPTION OF THE PREFERRED EMBODIMENT

The following embodiment is included to further illustrate the invention.

EXAMPLE 1

A preblend of 33.04 lbs. of a 90,000 cps silanol terminated polydimethylsiloxane and 1.65 lbs. of a trimethylsilyl terminated dimethyl D diphenyl D copolymer having a viscosity of 20 to 30 cs. and a diphenyl D content of 14 mole percent is prepared by mixing the components until a homogenous mixture is prepared. A separate preblend of 4.21 lbs. methylsiloxanetetramer treated fumed silica having a surface area of approximately 200 m²g and 42.17 lbs of stearic acid calcium carbonate is prepared by mixing the components until a uniform mixture is obtained. As the polymer is fed to an extruder, there are made sequential additions of the filler blend and pigment. Also, 13.22 lbs of trimethylsilyl terminated polydimethylsiloxane having a viscosity of 50 cs. and a silanol content of 400–900 ppm is also fed to the extruder with 3.82 lbs of a catalyst solution having the formulation of 1.5 pts. by weight of methyltrimethoxysilane, 1.8 pts. by weight of 1,3-dioxypropanetitanium-bis-ethylacetoacetate and 0.75 pts. by weight of 1,3,5-tristrimethoxysilylpropylisocyanurate.

The composition is extruded to form a fluid, curable RTV which is filtered into an appropriate moisture proof container.

EXAMPLE 2

Five separate streams of a 90,000 cps. silanol terminated polydimethylsiloxane, a trimethylsilyl terminated dimethyl D diphenyl D copolymer having a viscosity of 20 to 30 cs. and a diphenyl content of 14 mole percent, a methylsiloxanetetramer treated fumed silica having a surface area of approximately 200 m²g, a stearic acid treated calcium carbonate and a catalyst as employed in Example 1, are fed to a Werner-Pfleider Model Z SK-D 53 twin-screw devolatilizing extruder. The extrudate is a fluid curable RTV composition which is filtered into moisture proof containers.

Obviously, other modifications and variations of the present invention are possible in the light of the above teachings. It is, therefore, to be understood that changes may be made in the particular embodiments of this invention which are within the full intended scope of the invention as defined by the appended claims.

We claim:

1. A process for the preparation of a fluid composition that is stable under substantially anhydrous conditions and curable to a self-bonding elastic solid in the presence of moisture, said process comprising passing 100 parts by weight of a silanol chain stopped polydiorganosiloxane of the formula:

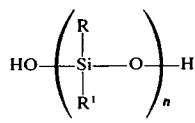

wherein R and $R^1$ are each, independently, organic radicals of up to 8 carbon atoms selected from hydrocarbyl, halohydrocarbyl and cyano lower alkyl and $n$ is an average number of from about 10 to 15,000, from 0.01 to 5.0 parts by weight of a crosslinking silane of the formula:

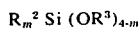

wherein $R^2$ and $R^3$ have the values defined for R and $R^1$ hereinabove and $m$ has a value of 0 to 3 and an average value based on the total amount of silane in the composition of 0 to 1.99, and a silanol reactive organometallic ester compound of a metal, said compound having radicals attached to the metal atom, at least one of said radicals being a hydrocarbonoxy radical or a substituted hydrocarbonoxy radical, said radicals being attached to the metal atoms through M—O—C linkages wherein M is the metal and any remaining valences of the metal are satisfied by substituents selected from organic radicals which are attached to the metal atom through M—O—C linkages, —OH and —O— of a M—O—M linkage, the weight ratio of the silanol reactive organometallic ester compound to the cross-linking silane always being at least unity, through a devolatilizing extruder to form a vulcanizable fluid composition that is curable to a self-bonding elastic solid in the presence of moisture.

2. The process of claim 1 wherein a filler is combined with the preblend of (a) and the silanol reactive organometallic ester compound prior to extrusion.

3. The process of claim 2 wherein the total number of the moles of cross-linking silane is less than the total of the number of moles of the terminal silanol groups in the polydiorganosiloxane.

4. The process of claim 2 wherein the total of the number of moles of silanol reactive ester linkages in the organometallic ester compound is equal to or greater than the total of the number of moles of terminal silanol groups in the polydiorganosiloxane component.

5. A process as defined in claim 3 wherein the total of the number of moles of silanol reactive ester linkages in the organometallic ester compound is equal to or greater than the total of the number of moles of terminal silanol groups in the polydiorganosiloxane component.

6. A process as defined in claim 1 wherein the weight ratio of the silanol reactive organometallic ester compound of a metal to the cross-linking silane is from 1 to 50.

7. A process as defined in claim 6 wherein the weight ratio of the silanol reactive organometallic ester compound of a metal to the cross-linking silane is from 1 to 10.

8. A process as defined in claim 7 wherein the weight ratio of the silanol reactive organometallic ester compound of a metal to the cross-linking silane is from 1 to 5.

9. A process as defined in claim 1 wherein the viscosity of the silanol chain-stopped polydiorganosiloxane is within the range of 2,000 to 1,000,000 cps. at 25°C.

10. A process as defined in claim 9 wherein the viscosity of the silanol chain-stopped polydiorganosiloxane is within the range of 20,000 to 200,000 cps at 25°C.

11. A process as defined in claim 1 wherein, in the silanol chain-stopped polydiorganosiloxane is at least 50% of the total number of R and $R^1$ groups are alkyl radicals and any remaining groups are aryl radicals.

12. A process as defined in claim 11 wherein the alkyl radicals are methyl radicals and any remaining aryl radicals are phenyl radicals.

13. A process as defined in claim 1 wherein, in the cross-linking silane, at least 50% of the total number of $R^2$ and $R^3$ groups are alkyl radicals and any remaining groups are aryl radicals and $m$ is 1.

14. A process as defined in claim 1 wherein the alkyl radicals are methyl radicals and any remaining aryl radicals are phenyl radicals.

15. A process as defined in claim 1 wherein, in said organometallic ester component, the metal M is selected from lead, tin, zirconium, antimony, iron, cadmium, barium, calcium, titanium, bismuth, manganese, zinc, chromium, cobalt, nickel, aluminum, gallium or germanium.

16. A process as defined in claim 15 wherein the organometallic ester component is an orthoester of a lower aliphatic alcohol, a partially chelated ester of a lower aliphatic alcohol with a β-dicarbonyl compound or a partial hydrolyzate of such compounds which retain at least one hydrocarbonoxy radical or substituted hydrocarbonoxy radical attached to the metal atom through M—O—C linkages.

17. A process as defined in claim 15 wherein in said organometallic ester component, the metal M is titanium.

18. A process as defined in claim 1 wherein from about 10 to about 200 parts by weight of a filler or fillers per 100 parts of the silanol chain stopped polydiorganosiloxane are fed as a separate stream or streams to the devolatilizing extruder.

19. A process as defined in claim 18 wherein said fillers are selected from the group consisting of calcium carbonate, fumed silica and mixtures thereof.

20. A process as defined in claim 16 wherein said organometallic ester component is a titanium chelate catalyst of the formula:

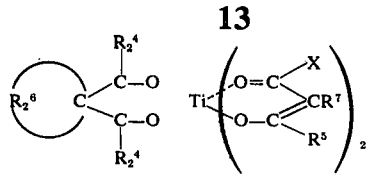

or

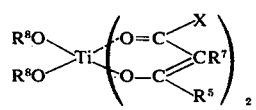

wherein $R^4$ is hydrogen, or an organic radical of up to 8 carbon atoms selected from hydrocarbyl, halohydrocarbyl, or carboxyalkyl; $R^5$ is a radical of up to 8 carbon atoms selected from hydrocarbyl, halohydrocarbyl and cyano-lower alkyl; $R^6$ is selected from same group as $R^4$ and in addition from halo, cyano, nitro, carboxy ester, or acyl and hydrocarbyl substituted by halo, cyano, nitro, carboxy ester and acyl, the total number of carbon atoms in the $R^4$ and in the $R^6$ substituted alkanedioxy radical being not more than about 18; $R^7$ is selected from hydrogen or an organic radical of up to 8 carbon atoms selected from hydrocarbyl, halohydrocarbyl, or acyl and, when taken together with $R^5$ forms together with the carbon atoms to which they are attached a cyclic hydrocarbon substituent of up to about 12 carbon atoms or such a substituent substituted with one or more of a chloro, nitro, acyl, cyano or carboxy ester sustituents; X is a radical of up to 20 carbon atoms selected from hydrocarbyl, halohydrocarbyl, cyanoalkyl, alkoxy, haloalkoxy, cyanoalkoxy, amino or ether and polyether groups of the formula —$(C_qH_{2q}O)_vR$ where $q$ is from 2 to 4, $v$ is from 1 to 20 and R is an organic radical of up to 8 carbon atoms selected from hydrocarbyl, halohydrocarbyl or cyano lower alkyl, $a$ is O or an interger of up to 8 and, when $a$ is O, the $>C — R_2^4$ groups are bonded to each other in a cyclic fashion, and $R^8$ is a radical of up to 8 carbon atoms selected from hydrocarbyl, halohydrocarbyl or cyano-lower alkyl.

21. A process as defined in claim 20 wherein said organometallic ester component is of the formula:

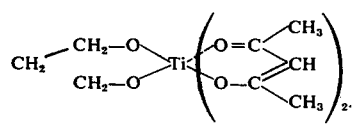

22. A process as defined in claim 20 wherein, in the cross-linking silane, $R^2$ and $R^3$ are alkyl and, in the organometallic ester component, $R^4$ and $R^6$ are hydrogen and $R^5$ is alkyl.

23. A process as defined in claim 20 wherein, in the cross-linking silane, $R^2$ and $R^3$ are methyl, and in the organometallic ester component, $R^5$ is methyl, X is $OC_{15}H_{31}$, and $a$ is 1.

24. A process as defined in claim 23 wherein, in the organometallic ester component, $R^4$ and $R^6$ are each hydrogen.

25. A process as defined in claim 22 wherein, in the cross-linking silane, $R^2$ and $R^3$ are methyl and, in the organometallic ester component, $R^5$ and X are methyl and $R^4$ and $R^6$ are hydrogen.

26. A process as defined in claim 20 wherein the polydiorganosiloxane is

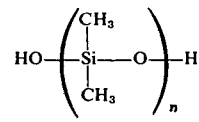

wherein $n$ is from about 300 to about 5,260; the cross-linking silane is $(CH_3)Si(OCH_3)_3$; and the organometallic ester component is

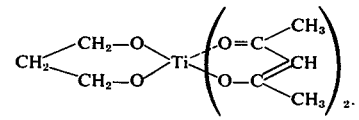

27. A process as defined in claim 20 wherein the polydiorganosiloxane is

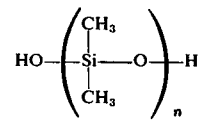

wherein $n$ is from about 370 to about 1,350; the cross-linking silane is $CH_3Si(OCH_3)_3$; and the organometallic ester component is

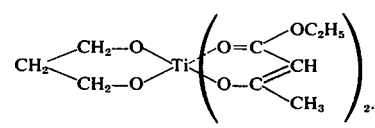

28. A process as defined in claim 20 wherein, in the organometallic ester component, $a$ is 0 or 1 and $R^4$ and $R^6$ are hydrogen or methyl.

* * * * *